(12) United States Patent
Roberts

(10) Patent No.: US 6,233,453 B1
(45) Date of Patent: May 15, 2001

(54) METHOD OF IMPROVING CO-OPERATION BETWEEN ENTITIES OF A CELLULAR MOBILE RADIOCOMMUNICATIONS NETWORK DURING CALL HANDOVER BETWEEN CELLS

(75) Inventor: Michael Roberts, Neuilly-sur-Seine (FR)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/199,321

(22) Filed: Nov. 25, 1998

(30) Foreign Application Priority Data

Nov. 27, 1997 (FR) .................................................. 97 14911

(51) Int. Cl.$^7$ ...................................................... H04Q 7/22
(52) U.S. Cl. .......................... 455/436; 455/437; 455/443; 455/444; 455/432
(58) Field of Search .................................... 455/436, 437, 455/443, 444; 445/432

(56) References Cited

U.S. PATENT DOCUMENTS

| | | | | |
|---|---|---|---|---|
| 5,826,188 | * | 10/1998 | Tayloe et al. | 455/428 |
| 5,911,122 | * | 6/1999 | Corriveau et al. | 455/432 |
| 5,930,710 | * | 7/1999 | Sawyer et al. | 455/436 |
| 5,999,814 | * | 12/1999 | Cuffaro et al. | 455/436 |
| 6,006,093 | * | 12/1999 | Aalto et al. | 455/443 |
| 6,044,271 | * | 3/2000 | Findikli | 455/438 |

\* cited by examiner

*Primary Examiner*—Daniel Hunter
*Assistant Examiner*—Alan Gantt
(74) *Attorney, Agent, or Firm*—Sughrue, Mion, Zinn, Macpeak & Seas, PLLC

(57) ABSTRACT

A method of improving co-operation between entities in a cellular mobile radiocommunications network, during intercell call handover, wherein, when handing over a call from a "current server cell" controlled by a "current server entity" of the system to a "new server cell" controlled by a "new server entity" of the system, which new server entity is distinct from said current server entity, said new server entity is informed of the reason for said handover.

9 Claims, 4 Drawing Sheets

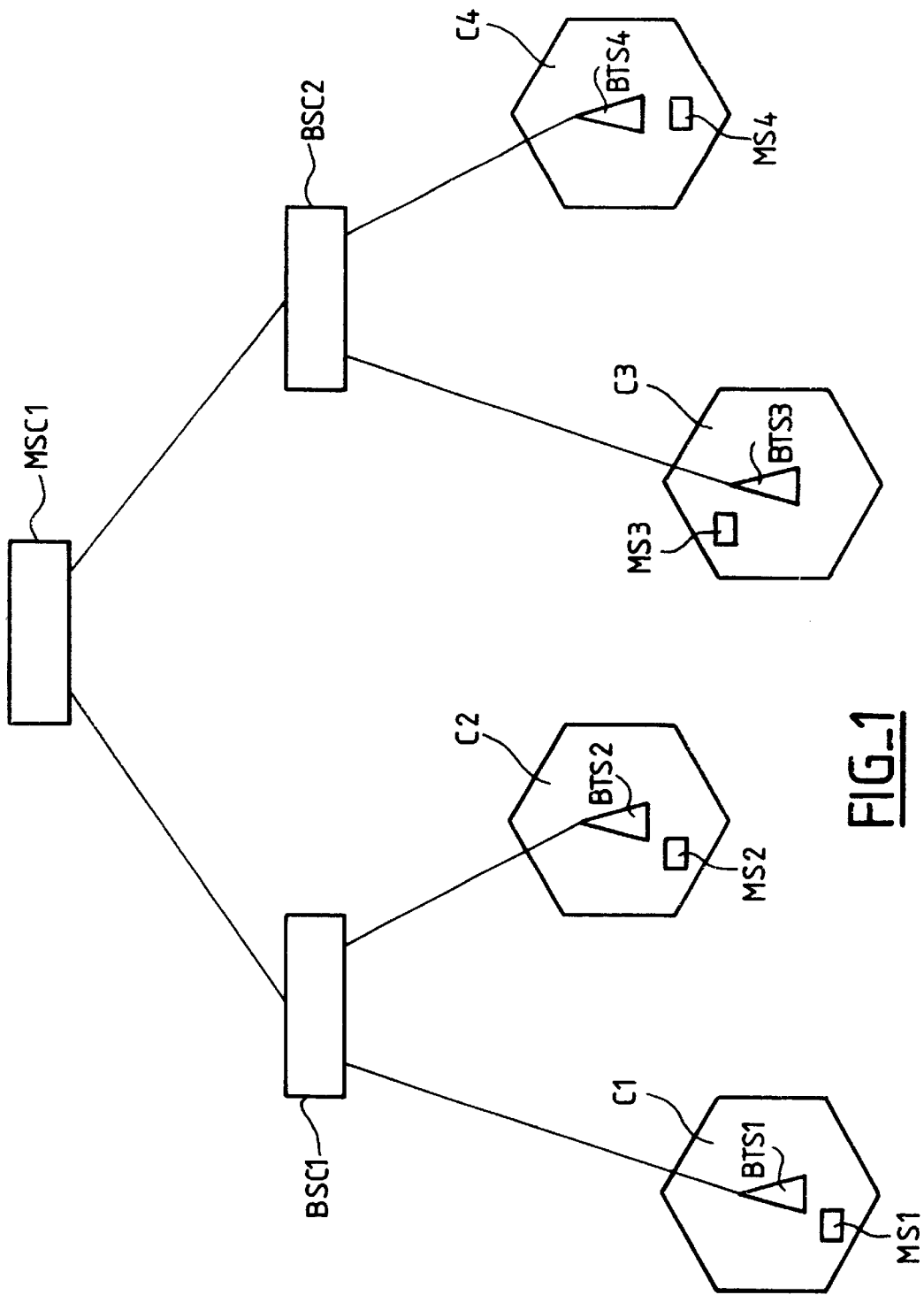
FIG_1

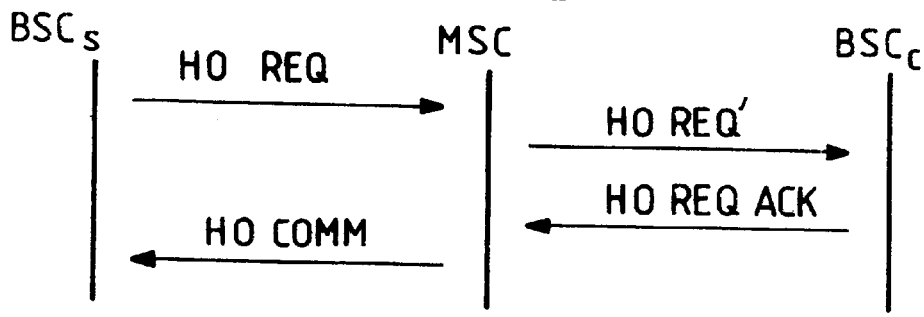
FIG_2
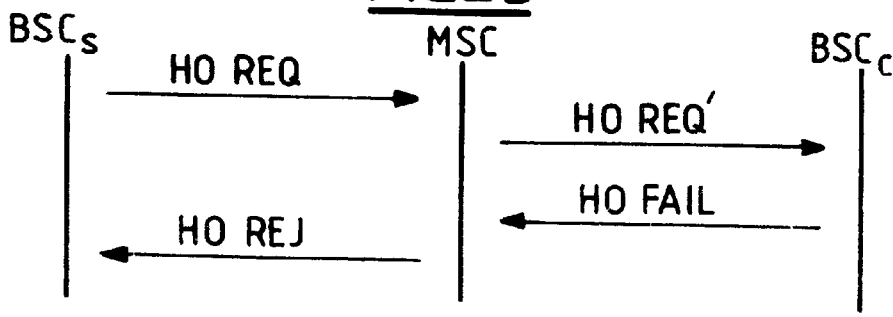
FIG_3
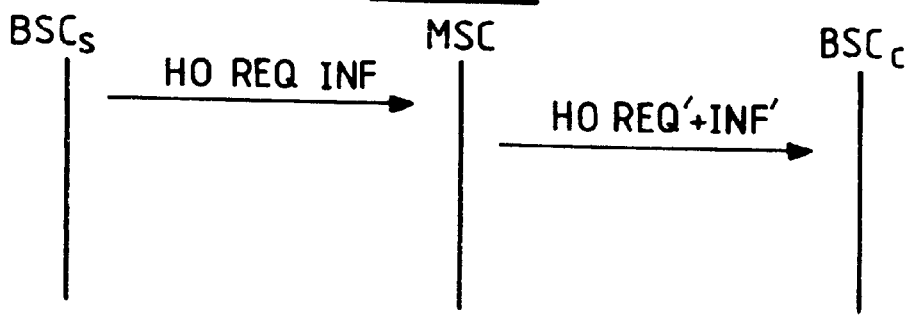
FIG_6

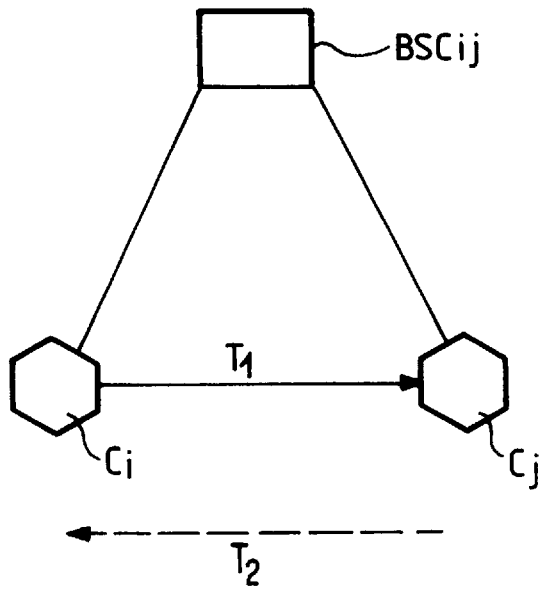
FIG_4
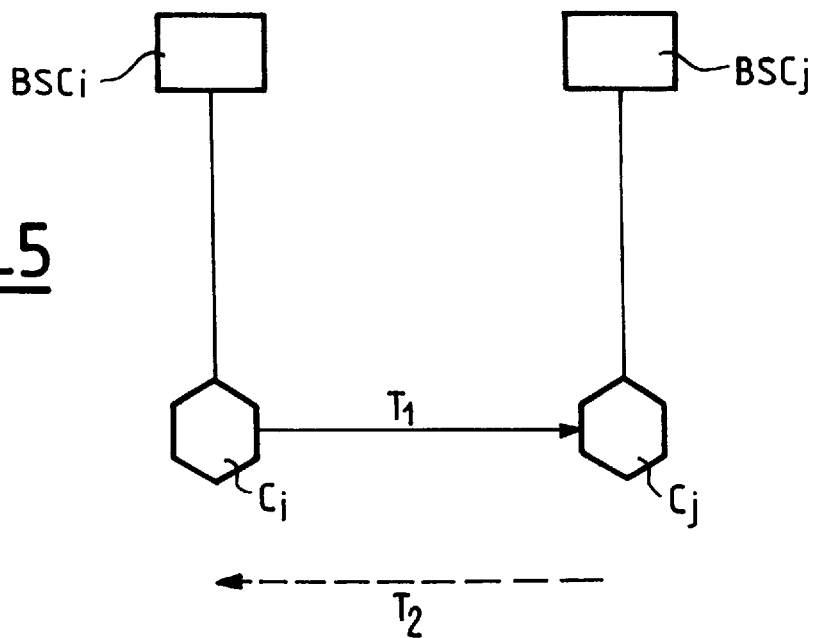
FIG_5

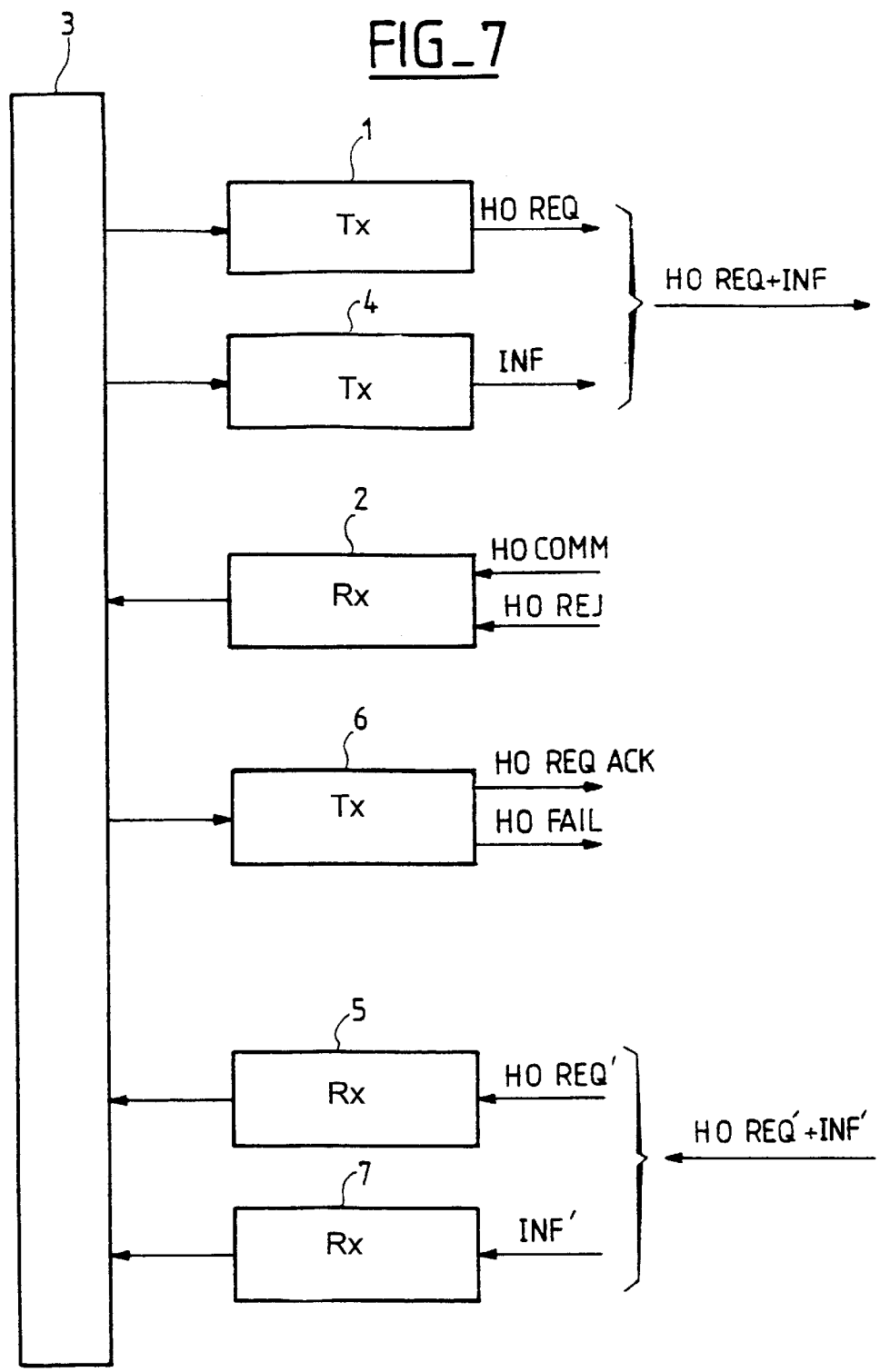

METHOD OF IMPROVING CO-OPERATION BETWEEN ENTITIES OF A CELLULAR MOBILE RADIOCOMMUNICATIONS NETWORK DURING CALL HANDOVER BETWEEN CELLS

The present invention relates generally to cellular mobile radiocommunications systems, more particularly to managing radio resources in such systems, and even more particularly to managing radio resources in such systems while handing over a call between cells (referred to aas "inter-cell call handover").

BACKGROUND OF THE INVENTION

With reference to FIG. 1, the general architecture is recalled of a cellular mobile radiocommunications system such as, in particular, the Global System for Mobile communications (GSM). Such a system essentially comprises:

a set of base stations or "Base Transceiver Stations" ("BTSs"), such as those referenced BTS1, BTS2, BTS3, and BTS4; in the example shown, each of the base stations is assigned to a respective cell, the cells being referenced C1, C2, C3, and C4 (other examples naturally being possible in which the same BTS is assigned to a plurality of cells), and the base stations co-operate with mobile stations, such as MS1, MS2, MS3, MS4, situated in the cells;

a set of "Base Station Controllers" ("BSCs"), such as those referenced BSC1 and BSC2, each of the BSCs controlling a respective subset of cells from the point of view of managing the radio resources; in the example shown, the Base Station Controller BSC1 controls the cells C1 and C2, and the Base Station Controller BSC2 controls the cells C3 and C4; and a set of "Mobile Switching Centers" ("MSCs"), such as that referenced MSC1, each of the MSCs co-operating with external networks, such as, in particular, Public Switched Telephone Networks (PSTNs) or Integrated Services Digital Networks (ISDNs), and controlling a subset of Base Station Controllers from the point of view of managing calls; in the example shown, the Mobile Switching Center MSC1 controls the Base Station Controllers BSC1 and BSC2.

In such a system, a decision to hand over a call is generally taken for reasons of improving the transmission quality of the radio signals in the network, in particular so as to improve the quality of a call in progress (in particular to prevent the call from being cut off), or so as to improve the overall level of interference in the network.

In such a system, a decision to a hand over a call can also be taken for other reasons, in particular so as to overcome the problem of too much traffic in a cell, or because testing or maintenance operations are in progress in a cell. Under such conditions, handover may be said to be "forced" because it can go against the objects of the above-mentioned reasons of improving transmission quality.

In such a system, a decision to hand over a call is taken by the network on the basis of a certain number of parameters, such as, in particular, the results of measurements taken on radio signals for the current server cell and for cells neighboring the current server cell, and indications about the level of traffic in the cells and/or operator control data.

The cell to which the call is to be handed over may be referred to as the "new server cell", and it is further chosen from a set of cells referred to as "candidate cells" (determined on the basis of said measurement results) in the following manner.

Firstly a request is made to hand over the call to the best of the candidate cells. When such handover is possible, the best candidate cell constitutes the new server cell. When such handover is not possible, a request is made to hand over the call to the following candidate cell, in the order of preference of candidate cells, and so on.

A candidate cell to which handover is requested may also be referred to as the "target cell".

When the target cell is controlled by the same BSC as the current server cell (in FIG. 1, this situation corresponds, for example, to handover being requested from cell C1 to cell C2, or from cell C3 to cell C4, such handover also being referred to as "internal handover" or "intra-BSC handover"), the BSC in question is capable, by itself and internally, of determining whether or not handover to said target cell is possible, since the BSC is the network entity that is in charge of managing the radio resources both for the server cell and for the target cell.

When the target cell is controlled by a BSC (referred to as the "target BSC") other than the BSC (referred to as the "current server BSC" or more simply below as the "server BSC") that controls the current server cell (also referred to more simply below as the "server cells"), this situation corresponding for example, in FIG. 1, to a request to hand over a call from one or other of the cells C1 and C2 to one or other of the cells C3 and C4 (such handover also being referred to as "external handover", or "inter-BSC handover"), the procedure is as shown in one or other of FIGS. 2 and 3, namely:

the server BSC, referenced $BSC_s$, firstly sends a handover request message (referenced HO REQ in this example for "handover required") to the MSC;

the MSC in turn sends a message of the same type (referenced HO REQ' in this example for "handover request") to the target BSC, referenced $BSC_c$;

depending on whether or not a resource is available in the target cell, the target BSC sends to the MSC either, as shown in FIG. 2, a handover request acknowledgement message (referenced HO REQ ACK in this example) itself containing a handover command message, or else, as shown in FIG. 3, a message indicating that it is impossible to perform handover to said target cell (this message being referenced HO FAIL in this example for "handover failure"); and the MSC in turn sends a message of the same type to the server BSC, namely either a handover command message (referenced HO COMM in this example), or else a message indicating that it is impossible to perform handover to said target cell (this message being referenced HO REJ for "handover request rejected").

As shown in FIGS. 4 and 5, once a handover (or "transfer") $T_1$ from one cell $C_i$ to another cell $C_j$ has actually been performed, it is possible that the opposite handover $T_2$ back to the initial server cell might be requested, in particular because the results of measurements of radio signals relating to the new server cell and to the initial server cell become more favorable to the initial server cell again, e.g. because the mobile station is situated at the limit of coverage between the two cells. That phenomenon is also known as the "ping-pong" phenomenon.

A problem that arises when the first handover is "forced", i.e. when the decision to perform such handover is taken for reasons other than those of improving the transmission quality of the radio signals in the network.

If such other reasons continue to exist at the time at which the opposite handover is requested, they are considered as taking priority over the reasons of improving the transmission quality of the radio signals in the network, which reasons lie behind said opposite handover, and, under such conditions, such an opposite handover must not be authorized.

As shown in FIG. 4, when both of the two cells in question are controlled by the same BSC, referenced $BSC_{ij}$, the BSC is aware of the "forced" nature of the first handover, and is thus capable of deciding that such an opposite handover must not be performed.

As shown in FIG. 5, when the two cells in question are not controlled by the same BSC, the current server BSC (or "initial target BSC"), referenced $BSC_j$, uses the procedure recalled above with reference to FIGS. 2 and 3 to send a handover request to the target BSC (or "initial server BSC"), referenced $BSC_i$, and it then receives from the target BSC a message indicating that it is impossible to perform handover to the target cell (or "initial server cell").

In which case, an unnecessary handover request is made, thereby lengthening handover time unnecessarily, and giving rise to unnecessary consumption of transmission resources for the purpose of interchanging the corresponding signalling messages, and thus degrading the quality of service.

OBJECTS AND SUMMARY OF THE INVENTION

A particular object of the present invention is to avoid those drawbacks, i.e. to optimize operation of the network in such cases, and more generally to improve co-operation between entities of the network during "external" handover.

The present invention provides a method of improving co-operation between entities in a cellular mobile radiocommunications network, during inter-cell call handover, wherein, when handing over a call from a "current server cell" controlled by a "current server entity" of the system to a "new server cell" controlled by a "new server entity" of the system, which new server entity is distinct from said current server entity, and new server entity is informed of the reason for said handover.

Thus, in particular when handover is "forced", i.e. when the decision to hand over a call is taken for reasons other than those of improving the transmission quality, said new server entity is informed of the "forced" nature of the handover, and so it does not make an opposite handover request unnecessarily, thereby avoiding the above-mentioned drawbacks.

According to another characteristic, said information as to the reason for said handover itself includes an indication as to the lapse of time after which, once the call has been handed over from said current server cell to said new server cell, an opposite handover can, if necessary, be requested again.

Thus, the new server cell is then able to determine the time at which an opposite handover can, if necessary, be requested again, thereby making it possible to optimize network operation further.

The present invention also provides a cell control entity for a cellular mobile radiocommunications network, in particular a BSC for a network such as a network of the GSM type, for implementing such a method.

BRIEF DESCRIPTION OF THE DRAWINGS

Other objects and characteristics of the present invention will appear on reading the following description of an embodiment given with reference to the accompanying drawings, in which:

FIG. 1 is a reminder diagram showing the organization of a mobile radiocommunications network such as, in particular, the GSM network;

FIG. 2 is a reminder diagram showing the various messages interchanged between various entities of such a network during an external handover request, and when such handover is possible;

FIG. 3 is a reminder diagram showing the various messages interchanged between various entities of such a network during an external handover request, and when such handover is not possible;

FIGS. 4 and 5 are diagrams showing how the problem is solved by the present invention;

FIG. 6 is a diagram showing an example of a method of the invention for improving co-operation; and FIG. 7 diagrammatically shows an example of means to be implemented in accordance with the invention in a cell control entity for a cellular mobile radiocommunications network (in particular a BSC for a GSM-type network).

MORE DETAILED DESCRIPTION

In accordance with the invention, to improve co-operation between entities of the network during "external" call handover, namely handover from a "current server cell" (such as cell $C_i$ shown in FIG. 5) controlled by a "current server entity" of the system (such as entity $BSC_i$ shown in FIG. 5) to a "new server cell" (such as cell $C_j$ shown in FIG. 5) controlled by an entity of the system that is distinct from said current server entity and that is referred to as the "new server entity" (such as entity $BSC_j$ shown in FIG. 5), said new server entity is informed of the reason for said handover.

For this purpose, in the implementation described with reference to FIGS. 6 and 7, with a candidate cell to which handover is requested being referred to as the "target cell", with the control entity $BSC_c$ for controlling a target cell being referred to as the "target entity", and with each target entity potentially becoming the new server entity if the requested handover to said target cell is possible, each target entity is informed, during a request for handover to said target cell, of the reason for the handover request.

In addition, in the implementation described with reference to FIGS. 6 and 7, said information as to the reason for the handover request is transmitted from the server entity $BSC_s$ to the target entity $BSC_c$ via the entity MSC (or "higher-level entity") providing the link between said server entity and said target entity.

Thus, in the diagram shown in FIG. 6, such information as to the reason for the handover request (referenced INF) is associated with the message (HO REQ) transmitted to the MSC by the server BSC ($BSC_s$) by using the procedure recalled above with reference to FIGS. 2 and 3.

Similarly, in this implementation, the information is re-transmitted by the MSC to the target BSC ($BSC_c$), the information then being referenced INF' and also being associated, in the example shown, with the corresponding message (HO REQ') re-transmitted by the MSC to the target BSC ($BSC_c$).

In another implementation (not shown specifically), it is also possible for each target entity to be informed of the reason for the handover request by the entity MSC rather than by the current server entity. Such an implementation corresponds, in particular, to the case when the current server entity transmits the list of candidate cells to the MSC, and when the MSC itself successively makes the corresponding handover requests.

In particular, said information is information to the effect that said handover is a "forced" handover, i.e. the decision to perform the handover is taken for reasons other than those of improving the transmission quality of the radio signals in the network, this information thus making it possible to avoid the above-mentioned drawbacks.

Advantageously, said information itself then contains an indication as to the lapse of time after which, once the handover has been performed, opposite handover can, if necessary, be requested again, thereby making it possible to optimize network operation further.

FIG. 7 diagrammatically shows the type of means to be used, in an implementation of the invention, in a cell control entity for a cellular mobile radiocommunications network, in particular a BSC for a GSM-type network.

In a manner that is known and therefore not re-described in detail herein, for the case when the controlled cell is constituted by a server cell, such an entity BSC includes means 1 for transmitting a handover request message (HO REQ message) requesting handover to a target cell, and means 2 for receiving messages obtained in reply to such a request (HO COMM and HO REJ messages), these means 1 and 2 operating in known manner in association with means 3 for managing radio resources.

In the example shown, for the case when the controlled cell is constituted by a server cell, the entity BSC further includes means 4 for transmitting information INF as to the reason for a handover request. In the example shown, this information INF is transmitted in association with the handover request message HO REQ.

For this purpose, the means 4 receive information issued by the means 3 for managing radio resources and as to the reason for a handover request, and they put the information they receive in a form suitable for it to be transmitted to the entity MSC, so as to constitute the information INF.

Furthermore, when the information INF itself includes an indication as to the lapse of time after which opposite handover can, if necessary, be requested again, and when handover is requested to cope with a traffic overload in the server cell, or to satisfy a request for testing or maintenance in said server cell, said indication is, for example, constituted by data such as, for example, a lapse of time after which it is assumed that an event which has caused a traffic overload in the server cell will have disappeared, or after which a testing or maintenance operation in said server cell will have finished.

Also in a manner that is known and therefore not described again in detail herein, and for the case when the controlled cell is constituted by a target cell, such an entity BSC includes means 5 for receiving handover request messages (HO REQ' messages) and means 6 for transmitting either a handover request acknowledgement message (HO REQ ACK message), or a message indicating that it is impossible to perform handover to said target cell (HO FAIL message), these means 5 and 6 operating, also in known manner, in association with the means 3 for managing radio resources.

In the example shown, and for the case when the controlled cell is constituted by a target cell, the entity BSC further includes means 7 for receiving information such as INF' as to the reason for a handover request. In the example shown, this information INF' is received in association with the handover request message HO REQ'.

In particular, the means 3 for managing radio resources are controlled by means 7 in a manner such that, when the controlled cell is constituted by a cell that is successively a target cell and then a server cell, the means 1 are prevented from transmitting an opposite handover request when the initial handover is "forced".

Furthermore, when said information INF' includes an indication relating to the lapse of time after which an opposite handover can, if necessary, be requested again, the means 3 for managing radio resources are further controlled by the means 7 so as to authorize transmission of such an opposite handover request after such a lapse of time or after a lapse of time (e.g. a predetermined lapse of time) which is a function of said reason.

The means 1 for transmitting handover request messages (REQ messages), the means 2 for receiving messages obtained in reply to such a request (HO REJ and HO COMM messages), the means 5 for receiving handover request messages (HO REQ' messages), the means 6 for transmitting either a handover request acknowledgement message (HO REQ ACK message) or a message indicating that it is impossible to perform handover to a target cell (HO FAIL message), and, as regards their functions other than those relating to the present invention, the means 3 for managing radio resources may be means that are conventional and that therefore do not need to be re-described herein.

The particular manner in which the means 4 for transmitting information INF as to cells previously rejected, in which the means 7 for receiving corresponding information INF', and in which those particular functions of the means 3 for managing radio resources which relate to the present invention are implemented for the purpose of enabling them to operate using the above-described method poses no particular difficulty for the person skilled in the art, and does not therefore need to be specially described either.

It can be understood that the invention is not limited to the above-described examples, and that, more generally, it makes it possible to improve co-operation between entities in a cellular mobile radiocommunications network, during "external" inter-cell call handover.

What is claimed is:

1. A method of co-operation between entities in a cellular mobile radio communications network, during inter-cell call handover, wherein, when handing over a call from a current server cell controlled by a current server entity of the system to a new server cell controlled by a new server entity of the system, said new server entity being distinct from said current server entity, said new server entity is informed of the reason for said handover.

2. A method according to claim 1, wherein said information as to the reason for said handover includes an indication as to the lapse of time after which an opposite handover can be requested.

3. A method according to claim 1, wherein, for each of the potential target cells to which handover from said current server cell is possible, the corresponding target entity is informed, during a request for handover, of the reason for the handover request.

4. A method according to claim 3, wherein said information as to the reason for the handover request is transmitted by the current server entity to the target entity via a higher-level entity of the network, which entity provides the link between the server entity and the target entity.

5. A cell control entity for a cellular mobile radio communications network, comprising:

means for sending information as to a reason for a handover of a call during inter-cell call handover, when handing over said call from a respective current serving cell controlled by said cell control entity to a new serving cell controlled by a new server entity, said new server entity being distinct from said cell control entity; and means for receiving information as to a reason for handover during inter-cell call handover of a call, when handing over said call from a respective current serving cell controlled by a current server entity to a new serving cell controlled by said cell control entity, said current server entity being distinct from said cell control entity.

6. A cell control entity for a cellular mobile radio communications network, comprising:

means for sending information as to a reason for a handover of a call during inter-cell call handover, when requesting a handover from a respective current serving cell controlled by said cell control entity to a target cell controlled by a target entity, said target entity being distinct from said cell control entity; and means for receiving information as to a reason for handover during inter-cell call handover of a call, when requesting a handover from a respective current serving cell controlled by a current server entity to a target cell controlled by said cell control entity, said current server entity being distinct from said cell control entity.

7. An entity according to claim 6, further comprising means for selectively allowing transmission of a handover request, depending on information as to a reason for handover, received by said entity.

8. An entity according to claim 6, further comprising means for authorizing transmission of a handover request after a lapse of time indicated in an information as to a reason for handover, received by said entity.

9. An entity according to claim 6, further comprising means for authorizing transmission of an opposite handover request after a lapse of time indicated in an information as to a reason for handover, received by said entity.

* * * * *